US005425532A

United States Patent [19]

Wolfe

[11] Patent Number: 5,425,532

[45] Date of Patent: Jun. 20, 1995

[54] STATIONARY VISE JAW

[75] Inventor: Ingo E. Wolfe, Brooklyn Park, Minn.

[73] Assignee: Kurt Manufacturing Company, Inc., Fridley, Minn.

[21] Appl. No.: 174,602

[22] Filed: Dec. 28, 1993

Related U.S. Application Data

[63] Continuation of Ser. No. 938,958, Sep. 1, 1992, abandoned.

[51] Int. Cl.[6] .......... B23Q 3/02

[52] U.S. Cl. .......... 269/285; 269/244

[58] Field of Search .......... 269/134–138, 269/244, 240, 246, 285

[56] References Cited

U.S. PATENT DOCUMENTS

| | | | |
|---|---|---|---|
| 2,854,875 | 10/1958 | Patrick | 269/285 |
| 3,578,308 | 5/1971 | Jesionowski | 269/285 |
| 4,043,547 | 8/1977 | Glomb et al. | 269/244 |
| 4,750,722 | 6/1988 | Chick | 269/244 |

FOREIGN PATENT DOCUMENTS

| | | | |
|---|---|---|---|
| 177877 | 4/1986 | European Pat. Off. | 269/244 |

OTHER PUBLICATIONS

Kurt Manufacturing Company, Kurt Ang Lock Catalog, pp. 1–5, 1989.

*Primary Examiner*—Robert C. Watson

*Attorney, Agent, or Firm*—Westman, Champlin & Kelly

[57] ABSTRACT

The present invention provides an apparatus for forming a stationary vise jaw on a vise having improved deflection characteristics when loaded from a movable vise jaw. The apparatus comprises a block having a width defined by a vise jaw end surface facing the movable jaw and an end surface opposite the vise jaw end surface, and a height defined by an upper surface and a lower surface engaging a support surface of the vise. A channel is formed generally perpendicular to the width and within the block to open to the lower surface. The channel receives a member protruding from the support surface when the block is secured to the vise. A fastener such as a bolt secures the block to the support surface wherein the fastener is located between the channel and the vise jaw end surface at a distance along the width wherein a ratio between the distance from the vise jaw end surface to a reference axis of the fastener and the distance from the opposite end surface to the reference axis is greater than 0.5:1 and less than 1:1.

11 Claims, 2 Drawing Sheets

STATIONARY VISE JAW

This is a continuation of application Ser. No. 07/938,958, filed Sep. 1, 1992 now abandoned. Priority of the prior application is claimed pursuant to 35 USC§120.

BACKGROUND OF THE INVENTION

This invention relates to a vise used to hold a workpiece during machining. More particularly, the invention provides an apparatus for forming a stationary vise member or jaw on a vise, the stationary vise jaw having improved deflection characteristics when loaded from a movable vise jaw.

In the art of machining workpieces, numerical-control equipment is used which makes it possible to produce large numbers of identical pieces in a given amount of time, with any desired features (drilled or bored holes, milled or shaped slots, chased threads, etc.) being produced rapidly, accurately, and with minimal error from desired shapes and positions. The workpiece, which is to be machined, is positioned accurately within a vise between a stationary vise jaw or jaw block and a movable vise jaw or jaw block. The workpiece is secured with the vise by bringing the movable jaw to bear against the workpiece until movement of the movable jaw is sufficiently impeded by contact of the workpiece against the stationary jaw.

In precision machining processes, any movement of the workpiece from its expected position contributes to error of machined surfaces in the workpiece. One source of error that has persisted is attributable to deflection of the stationary vise jaw when clamping forces are reacted through it to secure the workpiece. Commonly, the stationary vise jaw is formed by securing a suitable block of material to the vise surface with at least one threaded bolt. A protruding member such as a key is positioned within a corresponding channel formed in a lower surface of the block to further position the block of material on the vise. The bolt is threaded into the block of material at a position between the key and a surface of the block facing the movable jaw.

Although the stationary vise jaw appears secured to the vise, deflection of the stationary vise jaw occurs when force is applied from the movable vise jaw. This deflection is at least partially attributable to compression of the key within the channel.

It might appear that the problem of stationary vise jaw deflection could be solved by forming a stationary vise jaw from a block of material much larger than the size currently in use, and fastening this block to the vise with a large number of bolts. As is well appreciated by those skilled in the art, however, such an approach would inordinately increase the cost of the vise as well as increase the size of the vise for a given opening between the stationary jaw and the movable jaw.

SUMMARY OF THE INVENTION

The present invention provides an apparatus for forming a stationary vise jaw on a vise having improved deflection characteristics when loaded from a movable vise jaw. The apparatus comprises a block having a width defined by a vise jaw end surface facing the movable jaw and an end surface opposite the vise jaw end surface. A channel is formed generally perpendicular to the width and within the block to open to the lower surface. The channel receives a member protruding from the support surface when the block is secured to the vise. A fastener such as a bolt secures the block to the support surface. The fastener is located between the channel and the vise jaw end surface at a distance along the width wherein a ratio between the distance from the vise jaw end surface to a reference axis of the fastener and the distance from the opposite end surface to the reference axis is greater than 0.5:1 and less than 1:1.

DETAILED DESCRIPTION OF THE PREFERRED EMBODIMENTS

Figure 1:
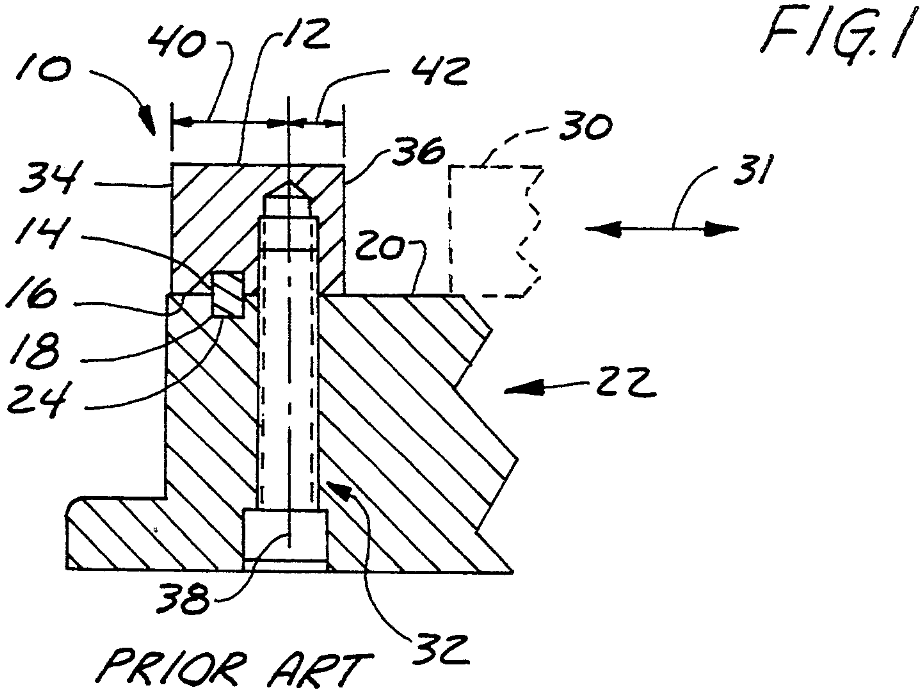
FIG. 1 is a schematic sectional view of a prior art stationary jaw secured to a vise.

Before discussing the improved stationary jaw of the present invention, a review of a typical prior art stationary jaw will be helpful. FIG. 1 schematically illustrates such a prior art stationary jaw 10. The stationary jaw 10 includes a suitable block of material 12. The block 12 has a channel 14 formed therein which opens to a lower surface 16. The channel 14 receives a member 18 protruding from an upper surface 20 of a vise body 22. The protruding member 18 is typically a key located in a corresponding channel 24 formed within the upper surface 20. The key 18 is positioned generally perpendicular to the direction of movement of a movable jaw 30 and acts as a stop to react shear forces to the vise body 22 when a workpiece is clamped between the stationary jaw 10 and the movable jaw 30.

The block 12 is secured to the vise body 22 with suitable fastening means such as a bolt 32. The number of bolts used to hold the block 12 to the vise body 22 is dependent on the size of the block 12. Commonly, for a block of six inches in length, two bolts are used. In other forms of stationary jaws, fastening bolts are also used between the key 18 and an end surface 34 of the block 12.

The position of the bolt along the width of the block has been found to be a contributing factor to the amount of deflection of the block when loaded from the movable jaw. In the prior art stationary jaws, as exemplified by FIG. 1, the ratio between a distance 42 from the vise jaw end surface 36 to a reference axis 38 of the bolt 32 and a distance 40 from the end surface 34 of the block 12 opposite a vise jaw end surface 36 to the reference axis 38 was equal to 0.5:1. In the present invention, the location of the bolt relative to the width of the block is moved closer to the center of the block. With relocation of the mounting bolt inward closer to the center of the cross-sectional width of the block, and the block tightened to the vise body in a manner described below, the amount of holding force present between the vise body and a portion of the block surrounding the key and rear of the mounting bolt is increased, thereby making the block more rigid to overturning moments when a clamping force is applied from the movable jaw.

Figure 2:
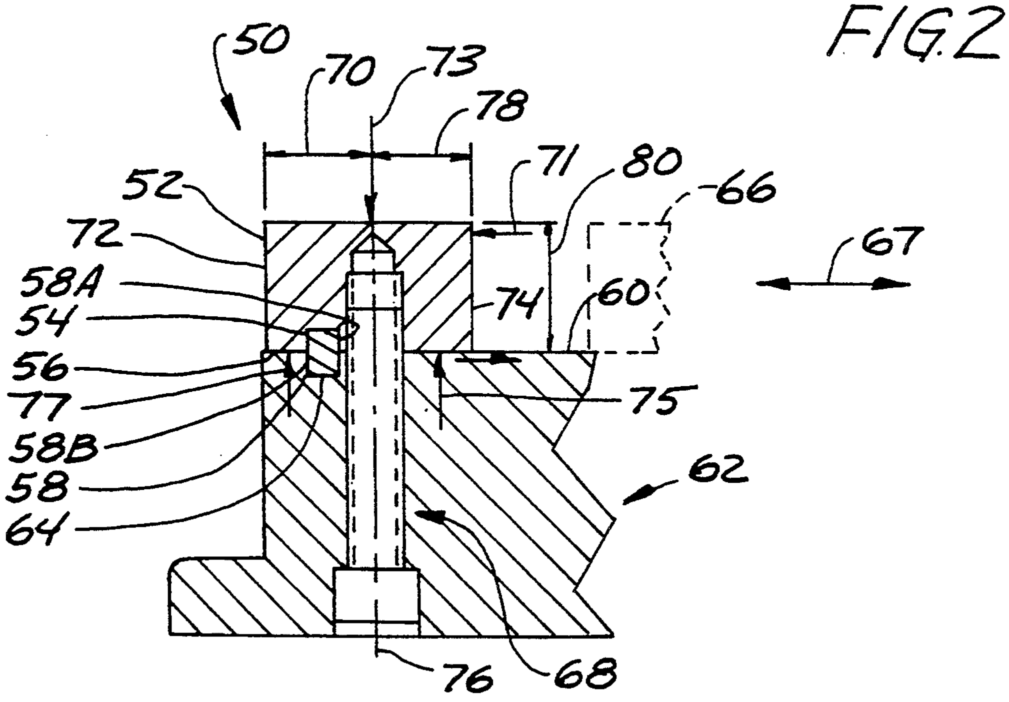
PRIOR ART FIG. 2
FIG. 2 is a schematic sectional view of an improved stationary jaw embodying the present invention.
Figure 3:
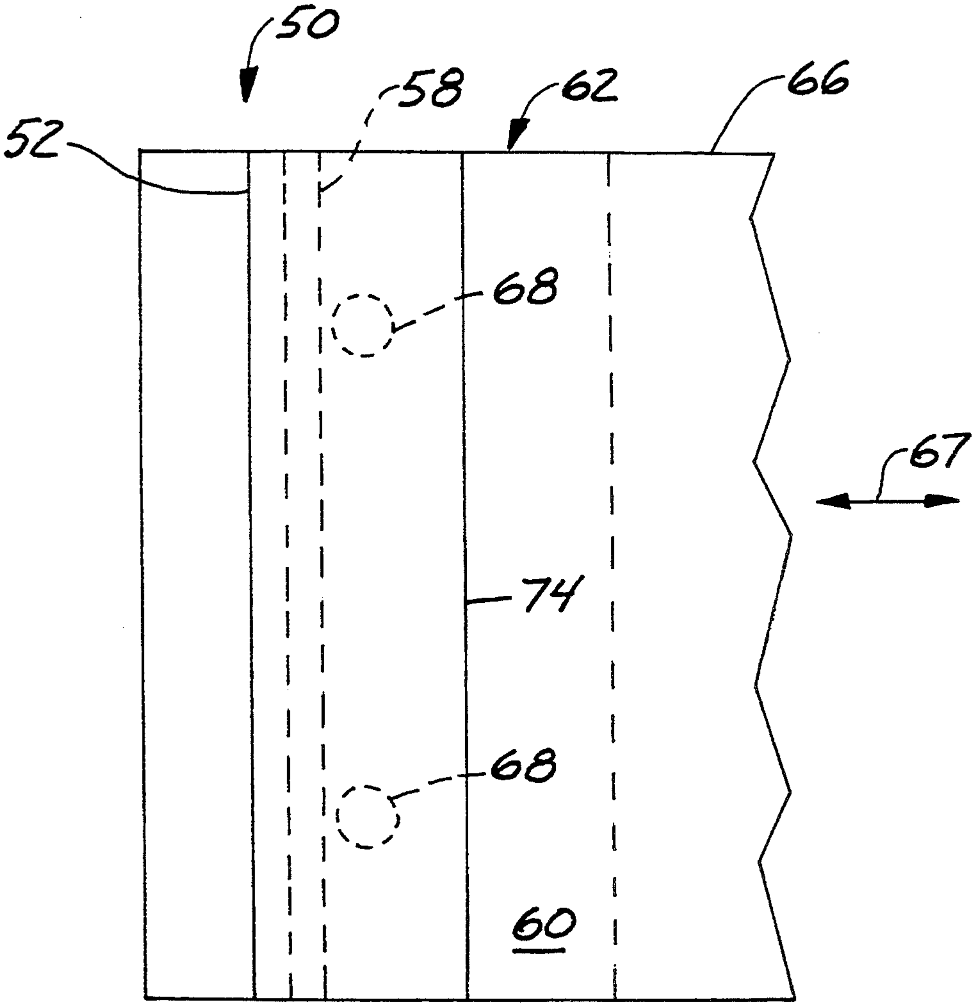
FIG. 3 is a schematic top plan view of the improved stationary jaw.

FIGS. 2 and 3 schematically illustrate an improved stationary jaw 50 of the present invention. The stationary jaw 50 includes a suitable block of material 52. The block 52 has a channel 54 formed therein which opens to a lower surface 56. The channel 56 receives a member 58, such as a key, protruding from an upper surface 60 of a vise body 62. The key 58 is located in a corresponding channel 64 formed within the upper surface 60. The key 58 is positioned generally perpendicular to the direction of movement of a movable jaw 66 and acts as a stop to react shear forces to the vise body 62 when a workpiece is clamped between the improved stationary jaw 50 and the movable jaw 66. A mounting bolt 68 secures the block 52 to the vise body 62. A vise screw, not shown, is rotated to move the movable jaw 66 toward and away from the stationary jaw 50 in the directions indicated by double arrow 67.

As stated above, deflection of the stationary jaw has been improved with location of the mounting bolt closer to the center of the block. In a preferred embodiment, a ratio of 0.75:1 is used between a distance 78 from a vise jaw end surface 74 to a reference axis 76 of the bolt 68 and a distance 70 from an end surface 72 of the block 52 opposite the vise jaw end surface 74 to the reference axis 76.

The desired ratio between the distance 70 and the distance 78 is obtained by slightly increasing the width of the block to provide additional stock material between the channel 54 and the vise jaw end surface 74. The additional stock material allows a larger bolt to be used to fasten or secure the block 72 to the upper surface 60 without overly decreasing the available working or jaw opening. With the use of a larger bolt, increased downward securing forces can be applied to the block 72 to secure it to the upper surface 60.

A second ratio affecting the deflection of the stationary vise jaw is defined by the distance 70 to a height 80 of the block 52. In the embodiment as shown, a ratio of 0.75:1 has been selected.

In the preferred embodiment, the block 52 is secured to the vise body 22 through sequential loading of the stationary jaw and tightening of the mounting bolts 68. Sequential loading and tightening compresses the block 52 to obtain the securing forces on the rear portion of the block 52 surrounding the key 58. In the preferred method of securing the stationary jaw 50 to the upper surface 60, after turning the mounting bolts 68 to remove excess space between the block 52 and the upper surface 60, three sequential loading and tightening operations are performed. Specifically, the bolts 68 are first approximately tightened to obtain five foot pounds of ("ft/lb") of torque and remove excess space between the block 52 and the upper surface 60. A clamping force indicated at 71 in FIG. 2, corresponding to approximately 50 ft/lb of torque on the vise screw is then applied through the movable jaw 66 to the stationary jaw 50 with a suitable spacer, not shown, placed between the movable jaw 66 and the stationary jaw 50. The mounting bolts 68 are then tightened to 50 ft/lb and a clamping force corresponding to approximately 100 ft/lb of torque on the vise screw is then applied through the movable jaw 66 to the stationary jaw 50. The mounting bolts 68 are then tightened to 100 ft/lb. Finally, in the third loading and tightening operation, a clamping force corresponding to 150 ft/lb of torque on the vise screw is applied to the stationary jaw 50 with the mounting bolts 68 then approximately tightened to 235 ft/lb of torque. In the preferred embodiment, with a block 52 having a lateral width of six inches generally perpendicular to the direction of movement of the movable jaw 66, a height of one and one-half inches above the upper surface 60, and a cross-sectional width generally parallel to movement of the movable jaw 66 of two inches, two standard bolts are used, each bolt having a diameter of ⅝".

FIG. 3 illustrates the securing forces present between the stationary jaw 50 and the vise body 22 after the block 52 has been fastened to the vise body 22. An arrow 73 represents the combined securing forces developed by the mounting bolts downward against the upper surface 60. An arrow 75 represents the forces upward against the lower surface 56 between the jaw end surface 74 and a plane bisecting the block 52 perpendicular to the cross-sectional width and including the reference axis 76. An arrow 77 represents the forces upward against the lower surface 56 between the opposite end surface 72 and the plane including the reference axis 76. As stated above, relocation of the mounting bolts closer to the center of the cross-sectional center of the block 52 increases the securing forces 77. Combined with the preferred fastening method described above, the securing forces 77 make the stationary jaw less susceptible to overturning moments when the clamping forces are applied from the moveable jaw, which in turn reduces deflection of the stationary jaw 50.

The loading and tightening procedure described above for fastening the block 52 to the vise body 22 also compresses the key 58 with opposite side surfaces 58A and 58B responding to a shear force generally parallel to the upper surface 60. It should be understood that the fastening means are selected in order that the securing forces 73 are sufficient to retain the key in compression. Specifically, given a maximum expected clamping force to be applied between the stationary jaw 50 and the movable jaw 66, a friction force, indicated by arrow 79, developed between the lower surface 56 and the upper surface 60 in a direction generally to oppose the clamping force should have a magnitude greater than or equal to the applied clamping force. For example, given a maximum expected clamping force 71 equal to 12,000 lbs., the friction force 79 should be equal to exceed 12,000 lbs. In the embodiment illustrated in FIG. 2 where two ⅝" bolts are used between the key 58 and the vise jaw end surface 74, each bolt can be tightened to develop approximately 31,000 lbs. of force or a combined securing force 73 of 62,000 lbs. Assuming a coefficient of friction of 0.2 between a stationary jaw block and a vise body manufactured from ductile iron having relatively smooth surfaces, the combined securing force of the bolts generates a frictional force 79 between the lower surface 56 and the upper surface 60 approximately equal to 12,400 lbs. (62,000 times 0.2). With the frictional force 79 greater than the maximum expected clamping force 71, the key 58 is retained in compression.

In summary, the present invention provides an apparatus for forming an improved stationary jaw on a vise having improved deflection characteristics when loaded from a movable vise jaw. By locating mounting bolts for the stationary jaw closer to the center of the cross-sectional width of the stationary jaw, sufficient preload securing forces can be provided to the rear portion of the stationary jaw. The present invention provides sufficient preload securing forces with only two mounting bolts thereby eliminating the cost associated with using additional mounting bolts.

Although the present invention has been described with reference to preferred embodiments, workers skilled in the art will recognize that changes may be made in form and detail without departing from the spirit and scope of the invention.

What is claimed is:

1. An apparatus for forming a stationary vise jaw on a support surface of a vise body, the stationary vise jaw having improved deflection characteristics when loaded from a movable vise jaw, the apparatus comprising:

a unitary block having a width defined by a vise jaw end surface facing the movable jaw and an end surface opposite the vise jaw end surface wherein a channel is formed generally perpendicular to the width within the block opening to a lower surface of the block, the channel receiving a member protruding from the support surface when the block is secured to the vise body; and fastening means having a reference axis generally perpendicular to the lower surface, the fastening means securing the block to the support surface wherein the fastening means is located between the channel and the vise jaw end surface at a distance along the width wherein a ratio between the distance from the vise jaw end surface to the reference axis and the distance from the opposite end surface to the reference axis is greater than 0.5:1 and less than 1:1.

2. The apparatus as specified in claim 1 wherein the ratio between the distance from the vise jaw end surface to the reference axis and the distance from the opposite end surface to the reference axis is greater than 0.63:1 and less than 1:1.

3. The apparatus as specified in claim 2 wherein the ratio between the distance from the vise jaw end surface to the reference axis and the distance from the opposite end surface to the reference axis is approximately equal to 0.75:1.

4. The apparatus as specified in claim 3 wherein the block has a height defined by a lower surface engaging the support surface of the vise and an upper surface, and wherein the second ratio between the distance from the opposite end surface to the reference axis and the height of the block is approximately equal to 0.75:1.

5. The apparatus as specified in claim 1 wherein the fastening means comprises a threaded bolt.

6. The apparatus as specified in claim 5 wherein the threaded bolt is secured in a threaded aperture of the block, the threaded aperture opening to the lower surface.

7. The apparatus as specified in claim 1 wherein the member protruding comprises a key located in a corresponding channel of the support surface.

8. An apparatus for forming a stationary vise jaw on a support surface of a vise, the stationary vise jaw having improved deflection characteristics when loaded from a movable vise jaw, the apparatus comprising:

a unitary block having a width defined by a vise jaw end surface facing the movable jaw and an end surface opposite the vise jaw end surface, wherein a channel is formed generally perpendicular to the width within the block opening to a lower surface of the block;

key means located in the channel and located in a second channel formed in the support surface; and bolt means having a reference axis generally perpendicular to the lower surface, the bolt means securing the block to the support surface through a threaded aperture in the block wherein the aperture is located between the channel and the vise jaw end surface at a distance along the width wherein a ratio between the distance from the vise jaw end surface to the reference axis and the distance from the opposite end surface to the reference axis is greater than 0.5:1 and less than 1.1.

9. The apparatus as specified in claim 8 wherein the ratio between the distance from the vise jaw end surface to the reference axis and the distance from the opposite end surface to the reference axis is greater than 0.5:1 and less than 1:1.

10. The apparatus as specified in claim 9 wherein the ratio between the distance from the vise jaw end surface to the reference axis and the distance from the opposite end surface to the reference axis is approximately equal to 0.75:1.

11. The apparatus as specified in claim 8 wherein the block has a height defined by the lower surface engaging the support surface of the vise body and an upper surface, and wherein the fastening means is located between the channel and the vise jaw end surface at a distance along the width wherein a second ratio between the distance from the opposite end surface to the reference axis and the height of block is approximately equal to 0.75:1.

* * * * *

UNITED STATES PATENT AND TRADEMARK OFFICE

CERTIFICATE OF CORRECTION

PATENT NO. : 5,425,532

DATED : June 20, 1995

INVENTOR(S) : Ingo E. Wolfe

It is certified that error appears in the above-indentified patent and that said Letters Patent is hereby corrected as shown below:

Column 6, line 27, delete "1.1" and insert --1:1--.

Signed and Sealed this

Third Day of October, 1995

Attest:

Bruce Lehman

BRUCE LEHMAN

*Attesting Officer*

*Commissioner of Patents and Trademarks*